(12) United States Patent
Bobsein et al.

(10) Patent No.: US 7,217,443 B2
(45) Date of Patent: May 15, 2007

(54) BINDER COMPOSITION

(75) Inventors: Barrett Richard Bobsein, Sellersville, PA (US); Jin-Chih Chiang, Lansdale, PA (US); Scott Lind Egolf, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 100 days.

(21) Appl. No.: 11/136,848

(22) Filed: May 25, 2005

(65) Prior Publication Data

US 2005/0215704 A1 Sep. 29, 2005

Related U.S. Application Data

(62) Division of application No. 09/783,738, filed on Feb. 15, 2001, now abandoned.

(51) Int. Cl.
*B05D 1/28* (2006.01)
(52) U.S. Cl. .................. 427/428.01; 524/822; 524/831; 524/833; 428/511; 428/514
(58) Field of Classification Search .............. 524/822, 524/831, 833; 427/428.01; 428/511, 514
See application file for complete search history.

(56) References Cited

U.S. PATENT DOCUMENTS

| 3,365,410 | A | 1/1968 | Wesslan et al. |
| 4,421,902 | A | 12/1983 | Chang et al. |
| 4,427,836 | A | 1/1984 | Kowalski et al. |
| 5,476,900 | A | 12/1995 | Jenkins et al. |
| 5,521,266 | A | 5/1996 | Lau |

FOREIGN PATENT DOCUMENTS

| DE | 1696163 | 4/1966 |
| EP | 0019170 B1 | 11/1980 |
| EP | 0444791 A1 | 9/1991 |

*Primary Examiner*—Helen L. Pezzuto
(74) *Attorney, Agent, or Firm*—Leah Reimer

(57) ABSTRACT

A binder composition is provided including a copolymer binder and a hydrophobically modified alkali soluble emulsion polymer. The binder composition is useful as a component of paper coating compositions. As provided is a coating process including the paper coating composition and a paper substrate coated with a paper coating including the binder composition.

6 Claims, No Drawings

BINDER COMPOSITION

CROSS REFERENCE TO RELATED APPLICATION

This application is a division of application Ser. No. 09/783,738, filed Feb. 15, 2001, abandoned, entitled Binder Composition, the entire disclosure of which is incorporated herein by reference.

The present invention relates to a binder composition including two emulsion polymers. In particular the binder composition includes one emulsion polymer which is a copolymer binder and a second emulsion polymer which is a hydrophobically modified alkali soluble emulsion polymer. The binder composition is self-thickening upon the addition of base and is useful as a component of paper coating compositions. Further, the present invention provides a method of coating a paper substrate with a paper coating composition including the binder composition.

The use of emulsion polymers as binders for paper coatings is well known. An emulsion polymer binder may be used alone as a sole binder or in combination with other binders including starch or polyvinyl alcohol. Besides providing good binding strength such as good adhesion to the pigment particles and to the cellulose substrate, an emulsion polymer binder influences other properties of a paper coating including opacity, gloss, brightness, and ink receptivity.

Paper coating compositions are commonly applied onto the paper substrate at high application speeds and must have good runnability as defined by the ability to apply the paper coating composition onto the paper, meter off the excess paper coating composition, and obtain defect-free coated paper with the desired coat weight. The runnability of a paper coating composition is influenced by many factors including its solids content and components such as pigments, binders, and any components which may affect the viscosity of the paper coating composition including water soluble binders such as starch and polyvinyl alcohol. Runnability is well known to be influenced by the viscosity of the paper coating composition, in particular, the viscosity measured at high shear rates. It is desirable for a paper coating composition to have low viscosity at high shear rates. In contrast to water soluble binders such as starch and polyvinyl alcohol, the use of emulsion polymer binders allows paper coating compositions to be formulated at lower viscosities and higher solids.

EP 0019170 B1 to Wendel et al. discloses a binder composition for paper coatings which contains from 70–95 parts by weight of emulsion copolymer A and 30 to 5 parts by weight of emulsion copolymer B. Emulsion copolymer A contains as polymerized units from 80–96 weight % of $C_2$ to $C_8$ alkyl esters of acrylic acid, up to 19.5 weight % of styrene, acrylonitrile, methyl methacrylate, and 0.5 to 10 weight % of other monomers which form water soluble homopolymers. Emulsion copolymer B contains as polymerized units from 15 to 55 weight % of acrylic acid or methacrylic acid, up to 10 weight % acrylamide or methacrylamide, and from 85 to 45 weight % of other monomers which form water insoluble homopolymers. The binder composition allowed the preparation of paper coating compositions using smaller amounts of binder than prior binders known in the art.

As paper coating speeds have increased in recent years, there is a continuing need for binder compositions for paper coating compositions which provide a combination of good high speed runnability and good coated paper properties. However paper coated at high speeds has a shorter residence time within the drier section of a paper coater and consequently needs to be dried faster. To decrease the drying time, paper coating compositions for application at high coating speeds are often formulated at higher levels of solids than conventional coating compositions as less water needs to be removed to dry the coated paper. However, increasing the solids of a paper coating composition also increases the viscosity which may adversely affect runnability. Further, there is a need for binder compositions for the preparation of coated paper grades with low coat weights, especially at high coating speeds. These papers require binder compositions which provide a combination of good appearance properties, good printability, especially for rotogravure printing, and can be applied at a low coating thickness at high coating speeds.

The present invention provides a binder composition including a copolymer binder and a hydrophobically modified alkali-soluble emulsion polymer. The binder composition is useful in paper coating compositions especially in paper coating compositions for low coating weight papers which are applied at high coating speeds. The binder composition of this invention provides good runnability at high coating speeds and provides paper coatings with good appearance including gloss, brightness, opacity, and good printability.

In the first aspect of this invention, a binder composition is provided including a) from 80 to 98 weight % of a copolymer binder containing as polymerized units 98.5 to 70 weight % of at least one first monomer selected from the group including $C_2$–$C_8$ esters of (meth)acrylic acid, 1 to 30 weight % of at least one second monomer selected from the group including styrene, acrylonitrile, and methyl methacrylate, 0.5 to 5 weight % of at least one third monomer selected from the group including acrylic acid, methacrylic acid, acrylamide, methacrylamide, and 2-acrylamido-2-methylpropanesulfonic acid; wherein the copolymer binder is an emulsion polymer and has a glass transition temperature in the range of $-35°$ C. to $0°$ C.; and b) from 20 to 2 weight % of a hydrophobically modified alkali soluble emulsion.

In the second aspect of the invention, a coating process is provided including the steps of preparing a paper coating composition by admixing ingredients comprising 100 parts by dry weight pigment slurry; from 1.6 to 9.8 parts by dry weight copolymer binder containing as polymerized units 98.5 to 70% of at least one first monomer selected from the group including $C_2$–$C_8$ esters of (meth)acrylic acid, 1 to 30% of at least one second monomer selected from the group including styrene, acrylonitrile, and methyl methacrylate, 0.5 to 5% of at least one third monomer selected from the group including acrylic acid, methacrylic acid, acrylamide, methacrylamide, and 2-acrylamido-2-methylpropanesulfonic acid; wherein the copolymer binder is an emulsion polymer and has a glass transition temperature in the range of $-35°$ C. to $0°$ C.; and from 0.04 to 2.0 parts by dry weight hydrophobically modified alkali soluble emulsion; wherein the paper coating composition has a pH in the range of 6 to 10 and a solids level in the range of 30 to 75 weight %; b) applying the paper coating composition onto a paper substrate; and c) drying the paper substrate which is coated with the paper coating composition.

In the third aspect of this invention, there is provided a paper substrate coated with a paper coating composition containing 100 parts by weight pigment; from 1.6 to 9.8 parts by weight copolymer binder including as polymerized units 98.5 to 70% first monomer selected from the group including $C_2$–$C_8$ esters of (meth)acrylic acid, 1 to 30% second monomer selected from the group including styrene, acrylonitrile, and methyl methacrylate, 0.1 to 5% of at least one third monomer selected from the group including acrylic acid, methacrylic acid, acrylamide, methacrylamide, and 2-acrylamido-2-methylpropanesulfonic acid; wherein the copolymer binder is an emulsion polymer and has a glass transition temperature in the range of −35° C. to 0° C.; and from 0.04 to 2.0 parts by weight hydrophobically modified alkali swellable emulsion polymer.

As used herein, the term "(meth)acrylate" denotes both "acrylate" and "methacrylate" and the term "(meth)acrylic" denotes both "acrylic" and "methacrylic".

The binder composition of this invention includes a copolymer binder and a hydrophobically modified alkali-soluble emulsion polymer, referred to herein as "HASE polymer". The copolymer binder provides good paper coating properties and the HASE polymer provides good high speed runnability to the paper coating composition.

The copolymer binder is an aqueous emulsion polymer which includes as polymerized units from 70 to 98.5 weight % of a first monomer, 1 to 30 weight % of a second monomer, and from 0.1 to 5 weight % of a third monomer, based on the weight of the copolymer binder. The first monomers are ethylenically unsaturated monomers which may include $C_2$ to $C_8$ esters of (meth)acrylic acid such as ethyl acrylate, butyl acrylate, 2-ethylhexyl acrylate, butyl methacrylate, 2-hydroxyethyl acrylate, and hydroxyethyl methacrylate. Preferred first monomers include butyl acrylate, ethyl acrylate, and 2-ethylhexyl acrylate. The second monomers are ethylenically unsaturated monomers which may include styrene, substituted styrenes, acrylonitrile, methacrylonitrile, methyl methacrylate, and mixtures thereof. Preferred second monomers include styrene, acrylonitrile, and methyl methacrylate. The third monomers are ethylenically unsaturated monomers which help stabilize the aqueous dispersion of emulsion particles of the copolymer binder. The third monomers are selected from carboxylic acid containing monomers such as acrylic acid, itaconic acid, maleic acid, methacrylic acid, and fumaric acid; (meth) acrylamide and substituted (meth)acrylamides; 2-acrylamido-2-methylpropanesulfonic acid; and mixtures thereof. Preferred third monomers include acrylic acid, methacrylic acid, acrylamide, methacrylamide, and 2-acrylamido-2-methylpropanesulfonic acid.

The copolymer binder of the present invention may also contain further ethylenically unsaturated monomers which are not first monomers, second monomers, or third monomers. These monomers include functional monomers such as, but are not limited to, hydroxyl, aldehyde, amino, ureido, and polyether, which allow modification of the copolymer binder for specific applications. Examples include hydroxyl-functional monomers such as 2-hydroxyethyl (meth)acrylate, hydroxypropyl (meth)acrylate, and polyethyleneglycol (meth)acrylate; aldehyde-functional monomers such as (meth)acrolein; amino-functional monomers such as dimethylaminoethyl (meth)acrylate; epoxy-functional monomers such as glycidyl (meth)acrylate. Other functional monomers include acetoacetoxy ethyl methacrylate, dicyclopentadienyl (meth)acrylate, dimethyl meta-isopropenyl benzyl isocyanato ethyl methacrylate, N-vinyl pyrrolidone, and N,N'-dimethylamino(meth)acrylate. In addition, this includes polymerizable surfactants, including for example but not limited to Trem LF-40 (Henkel Corporation). Further, other types of ethylenically unsaturated monomers include multi-ethylenically unsaturated monomer which may be used to raise the molecular weight and crosslink the copolymer binder. Examples of multi-ethylenically unsaturated monomers that may be used include allyl (meth) acrylate, tripropylene glycol di(meth)acrylate, 1,6-hexanediol di(meth)acrylate, 1,3-butylene glycol di(meth) acrylate, polyalkylene glycol di(meth)acrylate, diallyl phthalate, trimethylolpropane tri(meth)acrylate, divinylbenzene, divinyltoluene, trivinylbenzene, and divinylnaphthalene. The monomer mixture that is polymerized to form the copolymer binder may optionally contain from 0 to 10 weight %, based on the weight of the copolymer binder, of further ethylenically unsaturated monomers.

The copolymer binder has a glass transition temperature in the range of −35° to 0° C., preferably in the range of −30° C. to −15° C. As used herein, the glass transition temperature is measured by differential scanning calorimetry.

The copolymer binder may be prepared by various processes known in the art including solution, suspension, and emulsion polymerization. A preferred process is aqueous emulsion polymerization which may require the use of one or more surfactants for emulsifying the monomers and for maintaining the polymer obtained in a stable, dispersed condition. Suitable surfactants include anionic, nonionic surfactants, and mixtures thereof, using from 0.1 to 10 weight % of surfactant based on the weight of total monomers.

Suitable anionic dispersing agents include, for example, alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium t-octylphenoxypolyethoxyethyl sulfate, having 1 to 30 oxyethylene units.

Suitable nonionic dispersing agents include, for examples, alkyl phenoxypolyethoxy ethanols, having alkyl groups of from 7 to 18 carbon atoms and from 6 to 60 oxyethylene units such as, for example, heptyl phenoxypolyethoxyethanols; ethylene oxide derivatives of long chained carboxylic acids such as lauric acid, myristic acid, palmitic acid, oleic acid, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections.

High molecular weight polymers such as hydroxyethyl cellulose, methyl cellulose, polyacrylic acid, polyvinyl alcohol, may be used as emulsion stabilizers and protective colloids.

The initiation of the emulsion polymerization process to prepare the copolymer binder may be carried out by the thermal decomposition of free radical precursors which are capable of generating free radicals suitable for initiating the polymerization of ethylenically unsaturated monomers. Free radical precursors such as, for example, ammonium or potassium persulfate, may be used alone or as the oxidizing component of a redox system which also includes a reducing component such as potassium metabisulfite, sodium thiosulfate, or sodium formaldehyde sulfoxylate. The free radical precursor and the reducing component together, referred to as a redox system herein, may be used at a level of from 0.01% to 5%, based on the weight of the monomers used. Examples of redox systems include t-butyl hydroperoxide/ sodium formaldehyde sulfoxylate/Fe(II) and ammonium persulfate/sodium bisulfite/sodium hydrosulfite/Fe(II). The polymerization temperature may be from 20° C. to 90° C., or more, and may be optimized for the catalyst system employed. The emulsion polymerization may be seeded to unseeded. Seeded polymerization is preferred and tends to yield aqueous dispersions of the copolymer binder having more uniform particle size than unseeded polymerization. The seed emulsion may be prepared in situ or in a separate polymerization.

Chain transfer agents including mercaptans, polymercaptans, and polyhalogen compounds are sometimes used in the polymerization mixture to moderate the molecular weight of the copolymer binder. Examples of chain transfer agents which may be used include long chain alkyl mercaptans such as t-dodecyl mercaptans, alcohols such as isopropanol, isobutanol, lauryl alcohol, or t-octyl alcohol, carbon tetrachloride, tetrachloroethylene, and trichlorobromoethane. Generally from 0 to 3% by weight, based on the weight of the monomer mixture, may be used.

The copolymer binder of this invention has weight average molecular weights in the range of 100,000 to greater than 1,000,000 and preferably in the range of 400,000 to 800,000, as measured by gel permeation chromatography.

The particles of the aqueous dispersion of the copolymer binder may have average diameters in the range of 0.10 μm to 0.50 μm as measured using a Brookhaven BI-90 Particle Sizer, which employs a light scattering technique. In a preferred embodiment, the copolymer binder had an average particle diameter in the range of 0.12 μm to 0.30 μm, which offered a combination of good paper binder properties and good high speed runnability.

The aqueous dispersion of the copolymer binder may be prepared at solids levels ranging from 10 weight % to above 55 weight %. It is preferred that the solids level be above 40% to obtain good reactor utilization. The copolymer binder may be prepared at any suitable pH, as determined by the polymerization process and adjusted by the addition of base or acid to a pH in the range of 2 to 6, prior to the addition of the HASE polymer.

The binder composition of the present invention also contains HASE polymer. The HASE polymers are utilized for increasing the viscosity of aqueous solutions including paper coating compositions. The HASE polymer includes as polymerized units, from 30 to 75 parts by weight of nonionic monomer, from 5 to 75 parts by weight of anionic monomer, and from 1 to 20 parts by weight of surfactant-containing monomer.

The nonionic monomer of the HASE polymer is an ethylenically unsaturated monomer which does not contain a positive or negative charge when in aqueous solution. The nonionic monomer has a carbon chain that is less than 8 carbon units in length. The amount of nonionic monomer as polymerized units in the HASE polymer may be 30 to 75 parts by weight, preferably 35 to 70 parts by weight, more preferably 40 to 65 parts by weight. Suitable nonionic monomers include $C_1$ to $C_7$ alkyl and $C_2$ to $C_7$ hydroxyalkyl esters of acrylic and methacrylic acid such as ethyl (meth)acrylate, methyl (meth)acrylate, 2-ethylhexyl acrylate, butyl (meth)acrylate, 2-hydroxyethyl acrylate, 2-hydroxybutyl methacrylate; vinyl aromatics and substituted vinyl aromatics such as styrene, vinyl toluene, t-butylstyrene, isopropylstyrene, and p-chlorostyrene; vinyl esters such as vinyl acetate and vinyl versatate; acrylonitrile and methacrylonitrile; dienes such as butadiene and isoprene, substituted ethylenes such as vinyl chloride and vinylidene chloride; and mixtures thereof. Preferred nonionic monomers include ethyl (meth)acrylate, methyl (meth)acrylate, 2-ethylhexyl acrylate, butyl (meth)acrylate, 2-hydroxyethyl acrylate, and 2-hydroxybutyl methacrylate. Most preferred nonionic monomers include ethyl acrylate, methyl acrylate, and butyl acrylate.

The anionic monomer of the HASE polymer is an ethylenically unsaturated monomer which contains a negative charge when in a basic aqueous solution. The amount of anionic monomer as polymerized units in the HASE polymer may be from 5 to 75 parts by weight, preferably 10 to 60 parts by weight, more preferably 20 to 50 parts by weight. Suitable anionic monomers include acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Preferred anionic monomers are acrylic acid, itaconic acid, 2-acrylamido-2-methyl-1-propanesulfonic acid, fumaric acid, and methacrylic acid. More preferred anionic monomers are methacrylic acid, 2-acrylamido-2-methyl-1-propanesulfonic acid, and acrylic acid.

The surfactant-containing monomer of the HASE polymer is an ethylenically unsaturated monomer with an attached surfactant group. The amount of surfactant-containing monomer as polymerized units in the HASE polymer may be from 1 to 20 parts by weight, preferably from 1 to 15 parts by weight, more preferably from 1 to 10 parts by weight. Examples of surfactant-containing monomers include surfactant esters such as $C_8$–$C_{30}$ alkylphenoxy (ethyleneoxy)$_{6-100}$ ethyl (meth)acrylates and $C_8$–$C_{30}$ alkoxy (ethyleneoxy)$_{6-50}$ ethyl (meth)acrylates, $C_8$–$C_{30}$ alkylphenoxy ethyl (meth)acrylates, and $C_8$–$C_{30}$ alkoxy ethyl (meth)acrylates. Other linkages such as, but not limited to ethers, amides and urethanes may be used. Other examples of surfactant-containing monomers include vinyl esters of $C_8$–$C_{30}$ carboxylic acid and $C_8$–$C_{30}$ alkyl ester of (meth)acrylate. Suitable surfactant-containing monomers include $C_{18}H_{37}(EO)_{20}$ (meth)acrylate and $C_{12}H_{23}(EO)_{23}$ (meth)acrylate. Preferred surfactant-containing monomers include $C_{18}H_{37}(EO)_{20}$ methacrylate and $C_{12}H_{23}(EO)_{23}$ methacrylate.

Chain transfer agents may be used to control the molecular weight of the HASE polymer. Suitable chain transfer agents are mercaptans, such as, for example, dodecylmercaptan, methyl mercaptopropionate, and mercaptopropionic acid. The chain transfer agent may be used at from 0.05 to 10 weight % based on the total weight of the HASE polymer.

The HASE polymer may contain a multiethylenically unsaturated copolymerizable monomer effective for crosslinking, such as, for example, diallylphthalate, divinylbenzene, allyl methacrylate, trimethylol propane triacrylate, ethylene glycol diacrylate or dimethacrylate, 1,6-hexanediol diacrylate or dimethacrylate, diallyl benzene, or mixtures thereof. Typically, from 0.05 to 20 weight % of the multiethylenically unsaturated copolymerizable monomer is used, based on the total weight of the HASE polymer.

The HASE polymer may be prepared by various processes known in the art including solution, suspension, and emulsion polymerization. A preferred process is aqueous emulsion polymerization which may require the use of one or more surfactants for emulsifying the monomers and for maintaining the polymer obtained in a stable, dispersed condition. Suitable surfactants and synthesis adjuvants are disclosed above for the emulsion polymerization of the copolymer binder of this invention. Aqueous polymerization to form HASE polymers is known in the art and is described in U.S. Pat. No. 4,421,902 to Chang et al. and U.S. Pat. No. 5,476,900 to Shay et al. The aqueous polymerization process may include cyclodextrin compounds to aid in the transport of the monomers during the polymerization process as disclosed in U.S. Pat. No. 5,521,266 to Lau.

The particle size of the HASE polymers may be in the range of 0.02 μm to 2 μm, preferably from 0.05 μm to 1 μm, more preferably from 0.1 μm to 0.5 μm. The particles of the HASE polymers may be dispersed in a continuous medium, preferably an aqueous medium. The solids level of the HASE polymer provided as an aqueous emulsion polymer may be in the range of 10 weight % to 50 weight %. The pH of the aqueous medium containing the HASE polymer is in the range of 1 to 6, preferably in the range of 2 to 5.5, and most preferably in the range of 3 to 5. At a pH above 6, the anionic groups in the HASE polymer undergo partial or complete neutralization leading to the swelling or the solubilization of the HASE polymer and a large increase in the viscosity of the medium. A HASE polymer in a medium with low viscosity facilitates the pumping and pouring of the HASE polymer, and permits uniform mixing with other components.

The binder composition of this invention may be prepared by admixing the aqueous dispersion of the copolymer binder and aqueous dispersion of the HASE polymer. The mixing order is not important as either component may be added to the other component or both components may be added simultaneously. The pH of the copolymer binder and the pH of the HASE polymer need to be below a pH of 6 to prevent thickening by the HASE polymer. In a preferred embodiment, the pH of the copolymer binder is adjusted to a pH in the range of 4 to 5 by the addition of a suitable buffer such as ammonium acetate. The copolymer binder and the HASE polymer may be mixed together at a range of temperatures including from 10° C. to 50° C. At temperatures above 30° C., gel formation generated by the addition of the HASE polymer into the copolymer binder was minimized by the addition of from 0.05 to 1% surfactant, based on the weight of copolymer binder. Suitable surfactants include anionic surfactants such as alkali polyethoxylated alcohol half esters of sulfosuccinic acid. Mechanical mixing devices may be used to distribute uniformly one component in the second component. It is preferred to provid the binder composition at a solids level above 40%, preferably above 45% to minimize storage and shipping volumes, and to allow the formulation of high solids mixtures containing the binder composition.

Additional ingredients in the binder composition may also include surfactants, dispersants, wetting agents, biocides, defoamers, lubricating aids.

In one embodiment of this invention, a method is provided for preparing a paper coating composition including the binder composition. The paper coating composition which is based on 100 parts by dry weight of pigment, includes from 1.6 to 9.8 parts by dry weight of the copolymer binder and from 0.04 to 2.0 parts by dry weight of the HASE polymer.

Generally, the dry pigment is first dispersed to form a pigment slurry. The preparation of pigment slurries is well known in the art and may include dispersants such as polyacrylic acid or surfactants to aid in the dispersion and stabilization of the pigment particles. Various pigment are suitable for the paper coating composition of this invention. The choice of pigment or mixture of pigments is generally determined by the desired paper coating properties and by cost. Suitable pigments include clays ranging from fine to coarse in particle size; calcined clay; calcium carbonates including precipitated and ground calcium carbonates; titanium dioxides including anatase and rutile; talc; silica; aluminum silicate; hydrated alumina; aluminum trihydrate; or combinations thereof. Other suitable pigment include synthetic pigments such as polystyrene resins and polymer particles with one or more voids such as opaque polymers as disclosed in U.S. Pat. No. 4,427,836 to Kowalski, et al. In one embodiment, the paper coating composition includes from 5 to 70 parts dry weight talc as pigment.

The paper coating composition may be admixed by blending the pigment slurry and the binder composition of this invention. The copolymer binder and the HASE polymer may be first combined to form the binder composition of this invention, or may be admixed individually or simultaneously with the pigment slurry. In a preferred embodiment, the binder composition of this invention is admixed with the pigment. After admixing pigment and the binder composition, an alkaline material may be added to increase the pH of the paper coating composition and activate thickening by the HASE polymer. At a pH above 5.5, the HASE polymer undergoes neutralization resulting in swelling and/or solubilization of the HASE polymer particle with concomitant thickening of the aqueous medium. A preferred pH range for the paper coating composition is from 6.5 to 10; a more preferred pH range is 7 to 9. The alkaline material may be any base which is water soluble and is compatible with the other components of the paper coating composition. Suitable alkaline materials include ammonium hydroxide, sodium hydroxide, potassium hydroxide, and triethanol amine. Alternately, the paper coating composition may be prepared by first adding alkaline material to the pigment slurry and then adding and admixing the binder composition of this invention.

Additional ingredients may be added to the paper coating composition of this invention including surfactants; dispersants; cothickeners such as alkali swellable emulsions, carboxymethyl cellulose, alginates; insolubilizers; corrosion inhibitors; antioxidizing agents; wetting agents; biocides; crosslinking agents such as glyoxal and melamine formaldehyde; defoamers; lubricating aids such as calcium stearate, sodium stearate, zinc stearate, polyethylene wax, polyethylene glycol, and bis stearamide wax; optical brighteners; and carriers for optical brighteners such as polyvinyl alcohol. Various cosolvents which are miscible with water may also be added. In a preferred embodiment, the paper coating composition contains an aqueous medium without cosolvents.

The solids of the paper coating composition may be in the range of 30 to 75 weight %. Preferred are solids levels are 40 to 70 weight % and more preferred are solids levels 50 to 60 weight % for paper coating compositions of this invention. High solids paper coating compositions are generally preferred for high speed coating as coating speed is often limited by the ability to remove water during the drying of the coated paper. As used herein, high speed coating refers to coating speeds of greater than 600 meters per minute and high solids refers to paper coating compositions with a solids level of 50 weight % and greater.

The paper coating composition may be applied to various substrates including paper such as freesheet and groundwood grades; paper board; labels; paper products used for newspapers, advertisements, poster, books or magazines; and building substrates such as wall paper, wall board, or ceiling tile. Preferably the paper coating composition is used to coat paper intended for rotogravure printing.

The amount of the paper coating composition applied to the substrate is generally in the range of 1 $g/m^2$ to 30 $g/m^2$, and preferably in the range of 3 $g/m^2$ to 12 $g/m^2$. The paper coating composition may be applied as a single step or using two or more steps to build the final coat weight. Further, the paper coating composition may also be applied to the second side of the substrate either simultaneously or as a separate coating step.

The paper coating composition may be applied to the substrate by techniques well known to those in the art. For example, the paper coating composition may be applied with a roll applicator such as a metered size press; a blade coater such as a short dwell time applicator; air knife coater; slot die coater such as a jet applicator; or brush. Preferred coating methods for high speed application include blade coater and metered size press.

EXAMPLE 1

Preparation of Binder Composition

Copolymer binder 1 was prepared by emulsion polymerization using a 5-liter round bottom flask equipped with a mechanical stirrer, a temperature control device, a condenser, monomer and initiator feed lines, and a nitrogen inlet. At room temperature, 596 grams of deionized water and 0.028 weight % sodium dodecyl benzene sulfonate, based on the total monomer weight, were added to the flask. The contents of the flask were heated to 88° C. while stirring under a nitrogen purge. A monomer emulsion was prepared in accordance with Table 1.1. Next, 0.15 weight % of sodium sulfate, based on the total monomer weight in 25 grams of deionized water was added to the flask, followed by 3% by weight of the total monomer emulsion, and 0.3 weight % of ammonium persulfate, based on total monomer weight, in 30 grams of deionized water. After the exotherm subsided, the remainder of the monomer emulsion was fed over a period of 150 minutes together with an initiator solution of 0.3 weight %, based on the total monomer weight of ammonium persulfate in 100 grams of deionized water.

TABLE 1.1

Monomer Emulsion for Copolymer Binder 1

| Ingredient | Amount |
|---|---|
| butyl acrylate | 1239.3 grams |
| styrene | 102.06 grams |
| acrylonitrile | 72.9 grams |
| acrylamide | 19.16 grams |
| acrylic acid | 14.58 grams |
| deionized water | 390 grams |
| sodium dodecyl benzene sulfonate | 14.58 grams |
| disodium ethoxylated alcohol half ester of sulfosuccinic acid | 15.86 grams |

The contents of the reaction flask were cooled down to 45° C. A mixture of 0.22 weight % ammonium acetate based on total monomer weight and 0.58 weight % Aerosol A-102 based on total monomer weight (Aerosol is a registered trademark of Cytex Industries Inc.) in 100 grams of deionized water was mixed into the reaction flask. Next, 486 grams of HASE polymer Acrysol TT-935 (Acrysol is a registered trademark of Rohm and Haas Co.) at 30% solids was introduced to the reaction flask. The binder composition containing the copolymer binder and the HASE polymer was filtered to remove gel.

Binder composition 1 contained 91 weight % copolymer binder 1 with a particle diameter of 0.25 μm and a glass transition temperature of −21° C., and 9 weight % of HASE polymer. The binder composition had a pH of 4.3 and a Brookfield viscosity of 0.20 Pascal-sec. The binder composition was stable as evidenced by the absence of gel formation or precipitation upon storage.

EXAMPLE 2

Preparation of Paper Coating Compositions

Preparation of Pigment Slurries: Slurry 2.1 was prepared by dispersing dry clay pigments into water by stirring 100 parts dry weight of pigment into a mixture of water and 0.15 parts dry weight of dispersant using a high speed dissolver. The mixture was stirred for 30 minutes at 5000 rpm. Slurry 2.2, which contained talc, was prepared by mixing slurry 2.1 with a talc slurry. The compositions of slurries and the paper coating compositions are reported based on 100 parts pigment by dry weight (pph).

TABLE 2.1

Pigment Slurries

| | Slurry 2.1 | Slurry 2.2 |
|---|---|---|
| delaminated clay Hydraprint, J. M. Huber | 80 pph | 56 pph |
| kaolin clay Hydrafine 90, J. M. Huber | 20 pph | 14 pph |
| talc, supplied as slurry at 60–62% solids; Finntalc C10XR, Mondo Minerals, Helsinki, Finland | | 30 pph |
| dispersant Acumer ® 9300, Rohm and Haas Co. | 0.15 pph | 0.11 pph |
| slurry solids (by weight) | 70% | 67% |

Preparation of Paper Coating Compositions: The paper coating compositions were prepared with several different ratios of the HASE polymer and the copolymer binder 2 but with the total level of HASE thickener+copolymer binder 2 at a level of 5.0 dry parts by weight based on 100 dry parts pigment by weight. Copolymer binder 2 was prepared by the process of Example 1 and had a composition of 77 butyl acrylate/21 styrene/1 methacrylic acid/1 2-acrylamido-2-methylpropanesulfonic acid. Also prepared were comparative paper coating compositions with the HASE thickener replaced with an alkali swellable emulsion thickener which did not contain hydrophobe groups (ASE). The ASE thickeners are well known in the art and may be prepared by various methods such as described in U.S. Pat. No. 2,999,038 to Drennen et al.

TABLE 2.2

Paper Coating Compositions

| Component | Amount |
|---|---|
| Slurry 2.1 | 100 pph |
| Copolymer Binder 2 + Thickener | 5.0 pph |
| Calcium Stearate | 1.0 pph |
| Ammonium Hydroxide | to pH = 8.75 |
| Water | to 55% weight solids |

HASE thickener: Acrysol® TT-935 Rohm and Haas Company Comparative 1:50EA/17MMA/33MAA (see U.S. Pat. No. 2,999,038) Evaluation of Paper Coating Compositions: The low shear viscosities of the paper coating compositions were measured using a Brookfield LVT viscometer at 50 rpm (Brookfield Engineering Laboratories, Inc.). The high shear viscosities were measured using a Hercules® Viscometer at 4400 rpm equipped with an E-bob (Kaltec Scientific, Inc.).

TABLE 2.3

Viscosities of Paper Coatings Containing Copolymer Binder and HASE and ASE Thickeners

| Thickener | Thickener Level (pph) | Binder Level (pph) | Brookfield Viscosity (Pascal-sec) | Hercules Viscosity (Pascal-sec) |
|---|---|---|---|---|
| no thickener | 0 | 5 | 0.043 | 0.0069 |
| HASE | 0.35 | 4.65 | 1.034 | 0.0176 |
| Acrysol ® TT-935 | 0.425 | 4.575 | 1.389 | 0.0216 |
|  | 0.50 | 4.50 | 1.719 |  |
|  | 0.55 | 4.45 | 2.080 | 0.0273 |
|  | 0.565 | 4.435 | 2.236 | 0.0261 |
|  | 0.58 | 4.42 | 2.364 | 0.0273 |
|  | 0.60 | 4.40 | 2.349 | 0.0291 |
| Comparative 1 | 0.8 | 4.2 | 1.132 |  |
|  | 0.9 | 4.1 | 1.337 |  |
|  | 1.1 | 3.9 | 1.605 |  |
|  | 1.3 | 3.7 | 1.864 | 0.0432 |
|  | 1.425 | 3.575 | 2.208 | 0.0477 |

Using the data in Table 2.3, the properties of the HASE and ASE thickeners were compared by extrapolating the levels of thickeners required to give a paper coating composition with a Brookfield viscosity of 1.500 Pascal-sec. The Hercules viscosities for paper coating compositions containing these levels of thickeners were extrapolated from the Hercules viscosity data in Table 2.3.

TABLE 2.4

Comparison of HASE and ASE Thickeners in Paper Coatings Containing Copolymer Binder

| Thickener Type | Thickener Level (pph) | Brookfield Viscosity | Hercules Viscosity |
|---|---|---|---|
| HASE | 0.45 | 1.500 Pascal-sec | 0.022 Pascal-sec |
| ASE | 1.05 | 1.500 Pascal-sec | 0.034 Pascal-sec |

The results show that a paper coating composition containing the binder composition of this invention indicated as HASE thickener type required a lower level of thickener than the paper coating containing the copolymer binder and the comparative ASE thickener. Further, the paper coating composition had a lower high shear viscosity than the comparative paper coating composition containing the copolymer binder and ASE thickener. The lower high shear viscosity indicated that the paper coating composition containing the binder composition of this invention has better high speed runnability on a paper coater.

EXAMPLE 3

Coating and Printing of Paper Coating Composition

Copolymer binder 3 was prepared by the process of Example 1 from 88 parts butyl acrylate, 9 parts styrene, 2 parts acrylamide, and 1 part acrylic acid. Copolymer binder 3 had a glass transition temperature of −27° C. and a particle diameter of 0.30 µm. A paper coating composition containing copolymer binder 3 was prepared according to Table 3.1. A comparative paper coating composition was prepared by replacing the copolymer binder and thickener with a commercial self-thickening paper binder, Acronal S223V (Acronal is a registered trademark of BASF). Ammonium hydroxide was added to the paper coating compositions to adjust the pH to about 8.5.

TABLE 3.1

Paper Coating Compositions

| Component | Paper Coating Composition 3 | Comparative Paper Coating Composition |
|---|---|---|
| Slurry 2.2 | 100 pph | 100 pph |
| Copolymer Binder 3 | 4.55 pph |  |
| Acrysol ® TT-935 | 0.45 pph |  |
| Acronal ® S223V |  | 5.0 pph |
| Nopco C104 | 1.0 pph | 1.0 pph |
| Brookfield Viscosity | 0.928 Pascal-sec | 0.752 Pascal-sec |
| Solids | 60.2 weight % | 59.2 weight % |

The paper coating compositions were coated onto 36.7 g/m² basis weight rotogravure grade paper at a coating speed of 762 meters per minute (2500 feet per minute) using a Cylindrical Laboratory Coater (Weyerhaeuser). The coated paper was conditioned and then tested at 25° C. and 50% relative humidity.

Sheet Roughness: Measured using a Messmer-Buchler M-950 Parker Print-Surf Tester (Manufacturer). A smoother surface has a lower test value, as reported in µm.

Sheet Gloss: Measured according to TAPPI test method T-480.

Sheet Brightness: Measured according to TAPPI test method T-542.

Sheet Opacity: Measured according to TAPPI test method T-425.

Printability: Printability was measured using the Helio missing dot method. The sheet was printed at a speed of 0.2 meters per second and pressure of 300 Newtons. Printability is reported as the length of the printed pattern in millimeters which gave 20 missing dots. A longer distance indicates better printability.

TABLE 3.2

Coated Paper Properties

| | Paper Coating Composition 3 | Comparative Paper Coating Composition |
|---|---|---|
| Coat Weight (g/m$^2$) | 8.74 | 9.18 |
| Sheet Roughness, μm | 0.90 | 0.96 |
| Sheet Gloss, % | 60.1 | 58.0 |
| Sheet Brightness, % | 73.0 | 72.7 |
| Sheet Opacity, % | 88.2 | 88.1 |
| Helio Test, mm | 107 | 106 |

Paper coating composition 3 which contains the binder composition of this invention was coated at a higher solids level than a comparative paper coating composition. With a coat weight of approximately 5% less than the coat weight of the comparative coating, the sheet and print properties of paper coated with paper coating composition 3 were equivalent to or better than the sheet and print properties of the paper coated with the comparative paper coating composition.

We claim:

1. A coating process comprising:
   a) preparing a paper coating composition by admixing ingredients comprising 100 parts by dry weight pigment slurry; from 1.6 to 9.8 parts by dry weight copolymer binder comprising as polymerized units 98.5 to 70% of at least one first monomer selected from the group consisting of $C_2$–$C_8$ esters of methacrylic acid and acrylic acid, 1 to 30% of at least one second monomer selected from the group consisting of styrene, acrylonitrile, and methacrylonitrile, 0.5 to 5% of at least one third monomer selected from the group consisting of acrylic acid, methacrylic acid, acrylamide, methacrylamide, and 2-acrylamido-2-methylpropanesulfonic acid; wherein said copolymer binder is an emulsion polymer and has a glass transition temperature in the range of −35° C. to 0° C.; and from 0.04 to 2.0 parts by dry weight hydrophobically modified alkali soluble emulsion, wherein the emulsion comprises as polymerized units from 30 to 75 parts by weight of nonionic monomer, from 5 to 75 parts by weight of anionic monomer, and from 1 to 20 parts by weight of surfactant-containing monomer selected from the group consisting of $C_8$–$C_{30}$ alkylphenoxy (ethyleneoxy)$_{6-100}$ ethyl (meth)acrylates, $C_8$–$C_{30}$ alkoxy(ethyleneoxy)$_{6-50}$ ethyl (meth)acrylates, $C_8$–$C_{30}$ alkylphenoxy ethyl (meth)acrylates, $C_8$–$C_{30}$ alkoxy ethyl (meth)acrylates, vinyl esters of $C_8$–$C_{30}$ carboxylic acids, $C_8$–$C_{30}$ alkyl esters of (meth)acrylate, $C_{18}H_{37}$(EO)$_{20}$ (meth)acrylate, and $C_{12}H_{23}$(EO)$_{23}$ (meth)acrylate; wherein said paper coating composition has a pH in the range of 6 to 10; and wherein said paper coating composition has a solids level in the range of 30 to 75 weight %;
   b) applying said paper coating composition onto a paper substrate; and
   c) drying said paper substrate coated with said paper coating composition.

2. The coating process of claim 1 wherein said paper coating composition has a solids level in the range of 50 to 70 weight %.

3. The coating process of claim 1 wherein the paper coating composition is applied at a speed greater than 600 meters per minute.

4. The coating process of claim 1 wherein the dry weight of said paper coating composition on said paper substrate is in the range of 3 to 12 grams per square meter.

5. A paper substrate coated with a paper coating composition comprising:
   a) 100 parts by weight pigment;
   b) from 1.6 to 9.8 parts by weight copolymer binder comprising as polymerized units:
      i) 98.5 to 70% first monomer selected from the group consisting of $C_2$–$C_8$ esters of (meth)acrylic acid;
      ii) 1 to 30% second monomer selected from the group consisting of styrene, acrylonitrile, and methacrylonitrile;
      iii) 0.1 to 5% of at least one third monomer selected from the group consisting of acrylic acid, methacrylic acid, acrylamide, methacrylamide, and 2-acrylamido-2-methylpropanesulfonic acid;
      wherein said copolymer binder is an emulsion polymer and has a glass transition temperature in the range of −35° C. to 0° C.; and
   c) from 0.04 to 2.0 parts by weight hydrophobically modified alkali swellable emulsion polymer, wherein the emulsion comprises as polymerized units from 30 to 75 parts by weight of nonionic monomer, from 5 to 75 parts by weight of anionic monomer, and from 1 to 20 parts by weight of surfactant-containing monomer selected from the group consisting of $C_8$–$C_{30}$ alkylphenoxy (ethyleneoxy)$_{6-100}$ ethyl (meth)acrylates, $C_8$–$C_{30}$ alkoxy(ethyleneoxy)$_{6-50}$ ethyl (meth)acrylates, $C_8$–$C_{30}$ alkylphenoxy ethyl (meth)acrylates, $C_8$–$C_{30}$ alkoxy ethyl (meth)acrylates, vinyl esters of $C_8$–$C_{30}$ carboxylic acids, $C_8$–$C_{30}$ alkyl esters of (meth)acrylate, $C_{18}H_{37}$(EO)$_{20}$ (meth)acrylate, and $C_{12}H_{23}$(EO)$_{23}$ (meth)acrylate, solids level in the range of 50 to 70 weight %.

6. The paper substrate of claim 5 wherein a coat weight of said paper coating composition is in the range of 3 to 12 grams per square meter.

* * * * *